B. R. ADKINS & W. Y. LEWIS.
CONVEYING APPARATUS.
APPLICATION FILED MAR. 30, 1905. RENEWED MAR. 2, 1909.

935,631.

Patented Oct. 5, 1909.

UNITED STATES PATENT OFFICE.

BENJAMIN R. ADKINS AND WILLIAM Y. LEWIS, OF FLUSHING, NEW YORK.

CONVEYING APPARATUS.

935,631.  Specification of Letters Patent.  Patented Oct. 5, 1909.

Application filed March 30, 1905, Serial No. 252,988. Renewed March 2, 1909. Serial No. 480,973.

*To all whom it may concern:*

Be it known that we, BENJAMIN R. ADKINS and WILLIAM Y. LEWIS, subjects of the King of Great Britain, and residents of Flushing, in the county of Queens, State of New York, have invented certain new and useful Improvements in Conveying Apparatus, of which the following is a specification, taken in connection with the accompanying drawings, which form a part of the same.

This invention relates to conveying apparatus and especially relates to apparatus for conveying passengers on disconnected independent supports which are separately engaged by driving screws or other means so as to be given a variable speed, preferably starting slowly with gradual acceleration and being gradually retarded at the end of the run, the intermediate distance being traversed at high speed.

In the accompanying drawings in which similar parts are designated by the same reference numeral in the several figures, Fig. 2 is an enlarged elevation of part of the same, Fig. 3 showing a detail of this construction. Fig. 4 is another enlarged view, while

Figure 1:
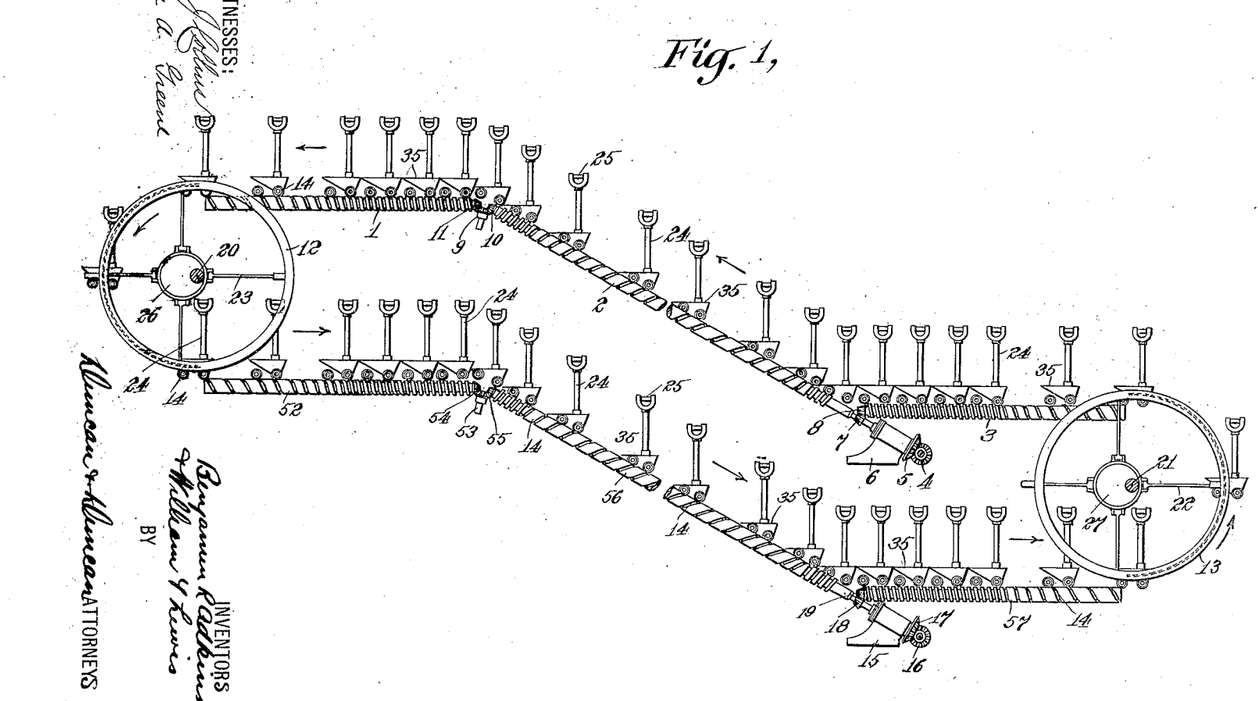
Figure 1 is a diagrammatic elevation of a form of this invention.
Figures 2, 3:
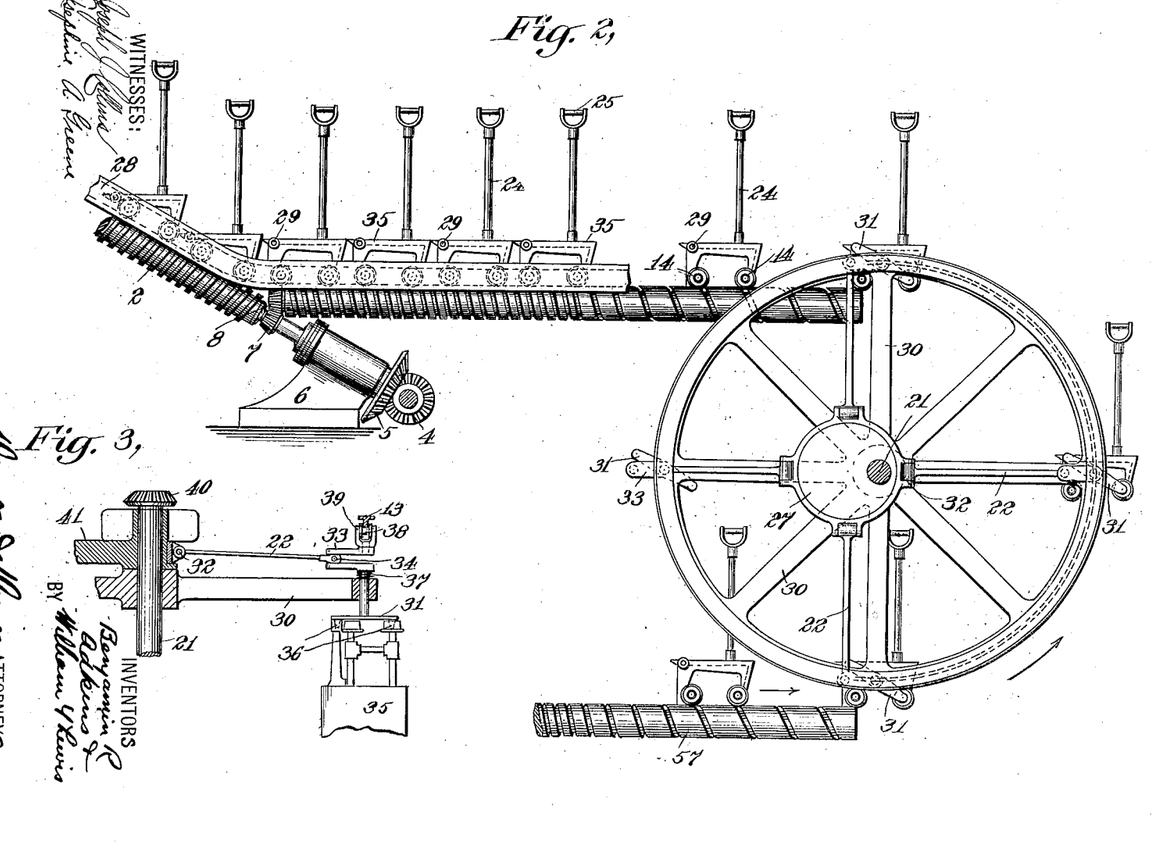
Figures 5, 6, 7:
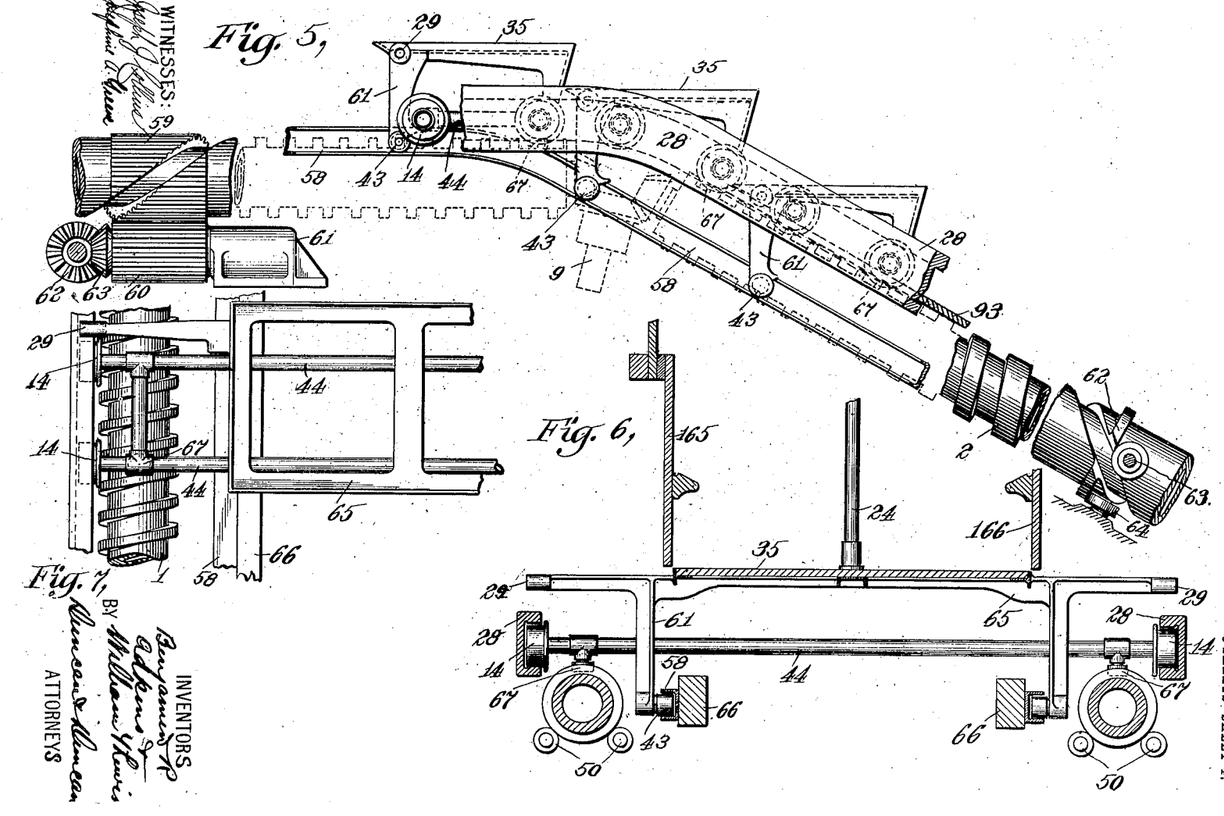
Figs. 5, 6 and 7 show details on a larger scale.

In the embodiment of this invention illustrated in Fig. 1, a series of supports or treads 35 are employed, each one entirely disconnected from the others and having separate engagement with the driving means. As indicated in Figs. 5, 6 and 7 these treads may comprise a suitable rigid frame 65 to which is secured the set of bars 44 which may, if desired, be of light tubular construction, as indicated. The lower bar 44 is rigidly mounted in the tread frame and carries at its end the guide-roll 14. This bar also serves as a pivotal point about which the other bar may move, the extent of this movement being limited by the contour of the depending braces 61 on the frame. This free bar carries suitable supporting rolls 14 at its outer ends. Each brace 61 carries at its lower end the diverting roll 43 and rigid bar 44 carries near either end of the same suitable means for engaging the driving mechanism, a driving roll 67 being indicated in Figs. 6 and 7. The tread frame is furnished with a suitable flooring or working face 35 intermediate its end and may be provided with a suitable standard 24 having a handle 25 at the top of the same for the use of passengers. Each of these independent supports may separately engage the driving means and in this way the movement of one support bears no necessary relation to those of the adjacent supports and wide variations in speed may be used in the various parts of the apparatus with this unit system of driving.

As indicated in Fig. 1, the driving means may be in the form of driving screws, the upper run being indicated in that figure as provided with the intermediate screws 2 and the terminal screws 1 and 3 coöperating therewith, while the lower run, which is also the descending run in this instance, is shown as provided with the intermediate screws 56 and the terminal screws 52 and 57. These screws may obviously be operated in any desired way. and the screws 2 may each be driven from a pinion 4 which is indicated as engaging the bevel gear 5 at the lower end of the screw 2 which is shown as supported in a suitable bearing 6. The gears 7 and 8 may be used to operate the screw 3 and the gearing 9, 10 and 11 may be used to drive the screw 1 from the screw 2. A similar driving device may operate the screws of the lower run from the gear 16, meshing with the coöperating bevel gear 17 to drive the intermediate screw 56 whose lower end is carried in the thrust block 15. The gears 18, 19 may be used to rotate the screw 57 and the gearing 53, 54, 55 may drive the screw 52, as is indicated in this instance. As is seen in Fig. 6 these driving screws may be supported in proper alinement in any desired way, such as by the use of suitable roller bearings 50 at the ends of the screws or at intermediate points, if desired. Suitable intermediate thrust bearings may also be used where desired, as is indicated in Fig. 5 and the thrust collar 62 may be formed on the screw at any desired point and be engaged by suitable rolls 63, 64, or by other means to insure the proper longitudinal position of the parts, the thrust collar being interrupted as indicated for the passage of the helical slot therethrough. Also, where long screws are employed, intermediate driving means, such as a gear, may be used, as is indicated in Fig. 5, where the projecting drive gear 59 is indicated on the screw and as being traversed by the helical slot of the thread, this gear being shown in engagement with a coöperating driving pinion, which is driven through the bevel gearing 62, 63 to suitably drive the screw. Two duplicate driving means are preferably employed in every instance to simultaneously engage each support, the two screws being right and left-handed, respectively, so that in this way the lateral thrust due to any slight friction or other action that may exist is entirely neutralized, this duplicate arrangement being indicated in Fig. 8, for instance.

Figure 4:
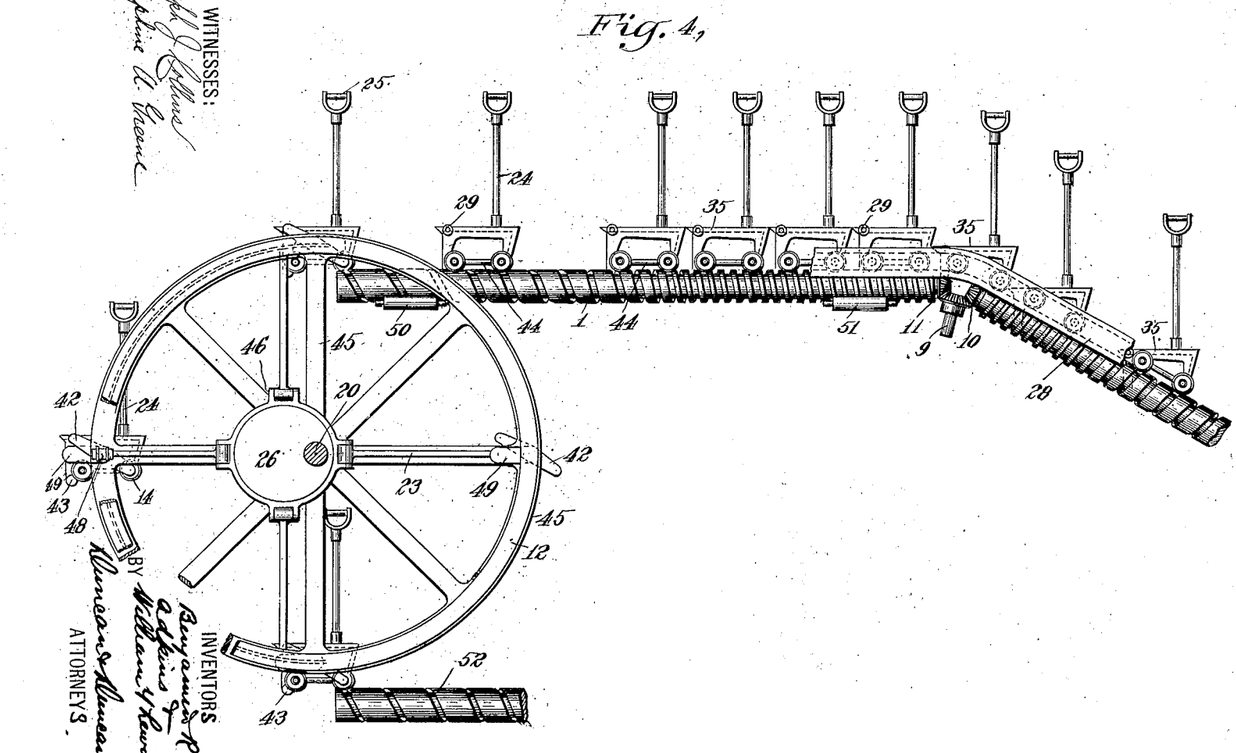

At the ends of the upper and lower runs suitable reversers are used to receive the supports as they cease engagement with one set of driving means and bring them into position to engage with the driving means of the other run. The rotary form of reverser indicated in Figs. 1, 2, 3 and 4 may be employed. This reverser 30 comprises a pair of large wheels secured to the central shaft 21 and revolved in unison with the screws through the driving pinion 40. Each of these wheels carries a series of yokes 31 which are provided with cranks 33 rigidly connected therewith and carrying at their outer ends the axial roll 38 mounted in the swiveling bracket 39 so as always to engage a fixed cam track 13 against which the rolls are forced by suitable springs 37. As the treads move toward the ends of the screws 57 they are engaged by the yokes on either side of them which are moving at substantially the same rate. These yokes are forced inward by the cam action described and the pins 36 on the yokes engage suitable recesses in the outer ends of the treads, preferably in the rigid rod 44 and in the projecting boss 29 which is also rigid with the tread. The reverser which is operated accurately in unison with the screws by any desired means thus picks up the tread at the proper time and as it continues to rotate the tread is carried thereby and maintained in parallel position as indicated, a feathering eccentric 27 being provided to the strap of which are secured the links 22, these links being engaged at their inner ends by the pins 32 and their outer ends 34 engaging a suitable pin in the cranks 33. By this means the treads are transferred between the conveyer runs. A similar arrangement is employed at the other end of the apparatus, as is indicated in Fig. 4, the reverser 45 in this instance being rigidly mounted upon the shaft 20 and carrying the yokes 42 at suitable intervals. These yokes are given the same feathering action as has been described by means of the eccentric 26 and the links 23 secured to this eccentric and to the cranks 49 of the yokes. The yokes are forced inward at the proper time by the cam track 12 which forces inward the cam rollers 48 so that suitable pins on the yokes engage depressions in the boss 29 and the end of the rod 44 so as to support the treads, carry them around in proper position and release them after they have engaged the screws 52.

As is indicated by the arrows in Fig. 1 the intermediate screw of the upper run of this conveying apparatus is the ascending one, and passengers may step upon the supports or treads where they are in close engagement at the low level. This is the starting station and the treads are brought close together at this point by the proper spacing of the screw threads in driving screws 3, which, as is indicated, serve to rapidly bring forward the treads after they are delivered from the reverser. Then by a more close spacing of the screw threads these treads are brought into contact so as to form a continuous support at this starting station and also in order that the treads may propel one another just at the point where they pass from engagement with the screws 3 to the screws 2. The threads on the screws 2 are preferably arranged so that the movement of each tread is gradually accelerated from the low speed which they possessed at the starting station to the desired high speed which is preferably maintained through the central part of this run. Thereafter the threads of the screw are gradually brought together by decreasing the pitch so as to cause a gradual retardation at the end of the run. The treads are brought into contact and may be used to propel one another at the point where they pass from engagement with the screws 1. It is, however, not necessary that the change of movement in a run be an exact uniform acceleration and uniform retardation, although this is desirable in most cases, since the strains on the parts are thereby minimized. It is also manifest that a number of starting and landing stations may be located at points along a single run; the pitch of the screws being correspondingly varied so as to give the supports a slow speed at any intermediate landing station. The arrangement and spacing of the threads on the driving screws of the lower run of this apparatus is similar to what has been described, and it will be noted that by employing reversers to transfer the treads from one run to another that the treads are delivered to the descending run in position to be used by descending passengers, the upper surfaces of the treads being substantially level in both instances. The treads are supported and guided during their motion by the rolls 14 which engage the guide track 28, see Figs. 4 and 5. When the treads are moving straight along the inclined portion of a run the free guide-roll can take its share of the weight of the tread, since at this time it can move upward so that the corresponding bar comes into solid engagement with the tread frame. Suitable diverting tracks 58 are preferably employed at the turns where the inclined screws meet the horizontal screws, and, if desired, these supplemental or diverting tracks may be continuous throughout the entire run. As indicated in Figs. 5 and 6 the diverting rolls engage these diverting tracks and as the treads approach the turn the free supporting roll 14 which remains in engagement with the guide track 28 no longer serves to support the tread, but the weight of this end of the tread is at this time supported on the diverting rolls, the free supporting roll moving downward in the tread into the position indicated in the upper part of Fig. 5. The support is thus maintained in proper position throughout the run and any undesirable tipping or tilting is avoided. The intermediate portions of the conveyer runs are furnished with suitable side pieces or facings 165 and 166, see Fig. 6 which confine the passengers to the working face of the tread. These side pieces are, of course, interrupted at the starting and landing stations to allow for the ready entrance and egress of passengers. A suitable stationary facing 93 is also preferably provided closely adjacent the treads on the inclined portions of the runs, although such an arrangement may in some cases also be used in horizontal runs of apparatus of this character.

Figure 8:
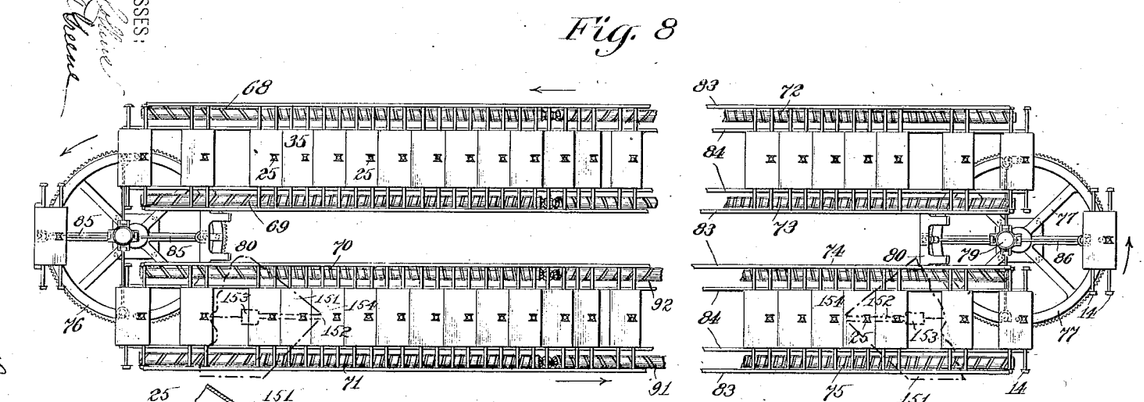
Fig. 8 is a plan view of a modification.
Figure 9:
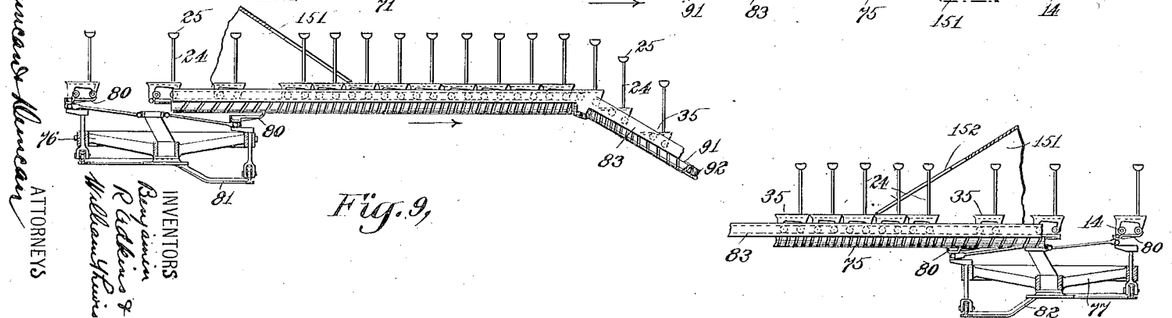
Fig. 9 is an elevation of the same.

Another arrangement of apparatus is indicated in Figs. 8 and 9. In this instance, the two runs of the conveyer are arranged side by side upon substantially the same level which is desirable in some cases. In the ascending run of the apparatus, the treads are operated by the right and left-handed screws, 72, 73 which may be substantially level. The treads may then engage with intermediate screws of suitable inclination and the horizontal screws 68, 69, may be employed at the landing station. Suitable shunting shields may be employed on any of these conveyers, such shields being indicated in dotted lines at 151 and being preferably composed of two inclined members placed at an angle on the two sides of the conveyer run and preferably having a projecting point 154 adjacent the center of the run. A suitable slot 152 is provided in these shields to accommodate the standards 24 and a suitable enlargement 153 of this slot allows the handles or other engaging means 25 to pass through the shield. A similar shield 151 may be arranged at the starting station to guide the passengers to some extent in getting on the supports. The reverser 76 employed in this instance comprises a substantially horizontal wheel or frame driven by suitable gearing in unison with the driving screws and this frame carries a series of cradles or yokes 80 which are raised at the proper time by a cam track 81 so as to come under and suitably support the treads. These cradles are kept in parallel position by a feathering device, links 85 being employed to connect these cranked cradles with an eccentric so that the treads are in this manner delivered to the descending run of the conveyer in proper position, as indicated in Figs. 8 and 9. The descending run comprises the screws 70, 71 which as indicated are of variable pitch, gradually bringing up the treads into close engagement so as to form a substantially continuous support and thereafter these treads which are guided by suitable channels or guides 83, are brought into engagement with the screws 91, 92, which, as indicated, have a variable pitch so as to cause a gradual acceleration of the movement of each tread and thereafter a suitable retardation, as has been described. It is, of course, understood that the degree of inclination of the intermediate or other portions of the conveyer may be varied as desired; and, indeed, in some cases the entire apparatus may be on substantially one level, forming practically a horizontal railway or conveyer of any length, the driving means being composed in such a case of any desired number of screw sections for convenience of operation, and in such cases the reversers do not necessarily have a feathering action as the supports may be symmetrical. At the end of the descending run the screws 74, 75 engage and operate the treads and deliver them to the reverser 77 by which they are transferred in parallel position to the ascending run of the apparatus.

Figure 10:
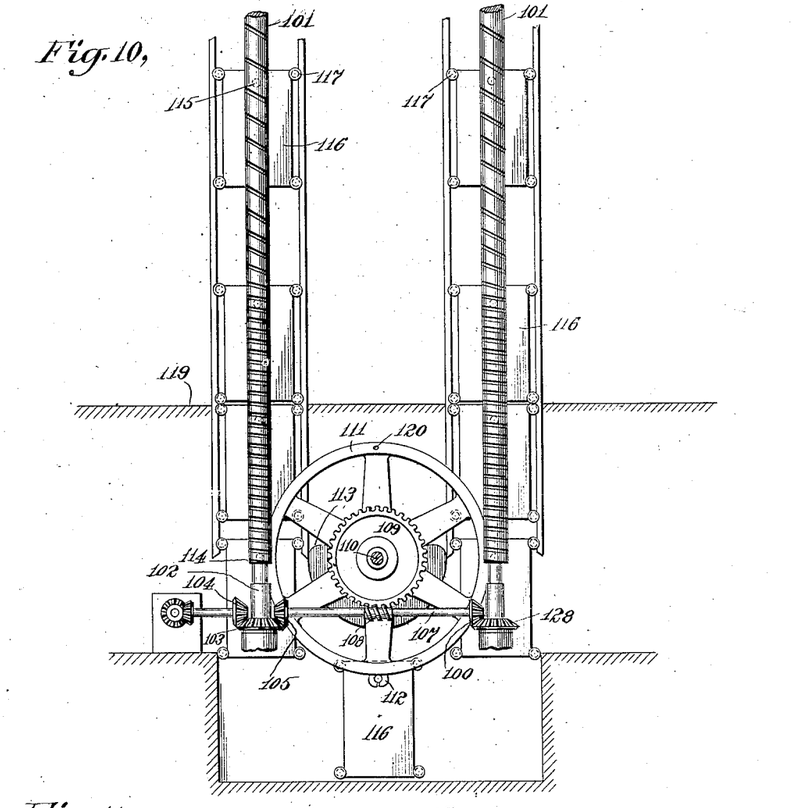
Fig. 10 is a plan of still another arrangement.
Figure 11:
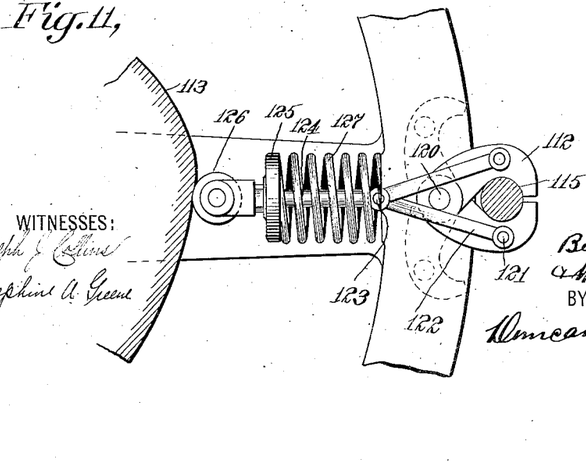
Fig. 11 is a detail of the same.

If desired, this apparatus may be used in a vertical or substantially vertical position, as indicated in Fig. 10, and in such case any desired number of driving screws 101 may be used in connection with each run of the conveyer. As indicated these screws are provided with threads 114 of varying pitch so that preferably a uniform acceleration and retardation takes place at the two ends or at other points of the run adjacent the starting and landing stations, while the intermediate portion of the run is preferably made at uniform high speed. The lower portion 102 of these screws is mounted in a suitable step bearing and may be driven through the bevel gear 103 which is engaged by the pinion 104. A similar pinion 105 may operate the shaft 107 carrying the pinion 106 and meshing with the gear 128 to drive the corresponding screw. In this instance, the reverser wheel is mounted upon the shaft 110 which also carries the worm wheel 109 engaged and driven by the worm 108 so that the reverser and screws are accurately driven in unison. This reverser is provided with a series of grips 112 which may be in the form of pivoted jaws indicated in Fig. 11, it being supported by suitable pin 120. The links 122 secured to the pins 121 in the jaws and to the pin 123 at the end of the rod 124 serve to open and close these jaws. The spring 127 acting on the head 125 and serving to normally open these jaws into the position indicated in dotted lines while the roll 126 operates when it engages the fixed cam 113 to force the links outward and to hold the jaws in closed position so that they engage and firmly support the trunnions 115 of the supports or cars. As indicated these supports may be substantially inclosed, as is usual in vertical elevators or lifts, and may be provided with suitable wheels or other guiding means 117 which may engage the usual vertical guides 118, these guides, of course, remaining at the ends of the vertical runs at which time the grips come into alinement with the trunnions are forced into engagement therewith and hold the supports or cars 116 in suspended position while they are carried from one run to another. A similar reverser is, of course, employed at the upper end of the apparatus.

It is, of course, understood that those familiar with this art may make many modifications in the form, size proportion and numbers of parts of this apparatus, parts of the same may be used without employing the whole and may be used in connection with other devices in other ways and for other purposes than specified without departing from the spirit of this invention or losing the advantages of the same. We do not, therefore, desire to be limited to the details of the disclosure which has been made in this case, but

What we claim as new and desire to secure by Letters Patent is set forth in the appended claims.

1. In conveying apparatus, a series of disconnected supports, guides for said supports forming a plurality of conveyer runs having inclined portions, driving screws of variable pitch coöperating with said runs to engage and independently drive each of said supports at variable speed at the different parts of said runs and reversers to transfer said treads from one run to another in substantially parallel position.

2. In conveying apparatus, a series of supports, guides for said supports forming various runs, including inclined portions, screws having variable pitch threads coöperating with said runs and engaging said supports and independently driving each of said supports at different speeds at the various parts of said runs and reversers to transfer said supports from one run to another.

3. In conveying apparatus, a series of disconnected supports, guides for said supports to form a conveyer run having an inclined portion, screws of variable pitch coöperating with said guides to engage and independently drive each of said treads at variable speed and means to transfer said supports from one end of said run to the other.

4. In conveying apparatus, a series of disconnected supports, guides for said supports forming runs having inclined portions and reversers to transfer said supports between said runs, said reversers receiving and delivering said supports in substantially parallel position.

5. In conveying apparatus, disconnected supports, guides for said supports forming conveyer runs having inclined portions, driving means for said supports and reversers to transfer said supports between said runs, said reversers receiving and delivering said supports in substantially parallel position.

6. In conveying apparatus, a series of supports, guides for said supports forming conveyer runs having inclined portions, driving means for said supports and rotary reversers to transfer said supports between said runs and maintain said supports in substantially parallel position.

7. In conveying apparatus, a series of supports, guiding and driving means for said supports forming a plurality of runs and rotary reversers to transfer said supports between said runs, said reversers having movable holding means for said supports to maintain them in substantially parallel position.

8. In conveying apparatus, a series of supports, guiding and driving means for said supports to form a plurality of runs and rotary reversers to transfer said supports between said runs, said reversers comprising pivoted holding means provided with cranks and eccentrically supported links connected with said cranks to maintain said holding means in substantially parallel position.

9. In conveying apparatus, a series of supports, guides for said supports forming a plurality of runs, driving means engaging said supports and independently driving them at variable speed and reversers operated in unison with said driving means to transfer said supports between said runs.

10. In conveying apparatus, a series of supports, guides for said supports to form a plurality of runs, driving means engaging and independently driving each of said supports at variable speed between the starting and landing stations of said runs, said supports being brought close together at said starting and landing stations, reversers operated in unison with said driving means to transfer said supports between said runs, said driving means separating said supports adjacent the ends of said runs.

11. In conveying apparatus, a series of supports, guiding means for said supports, a plurality of screws engaging and driving said supports and having their adjacent ends out of line, said supports engaging and driving one another when disengaged from said screws.

12. In conveying apparatus, a series of disconnected supports, guides for said supports, a plurality of driving screws engaging said supports and forming an angle to each other, said supports engaging and driving one another when disengaged from said screws.

13. In conveying apparatus, a series of supports, guides for said supports, a plurality of driving screws of variable pitch successively engaging said supports, said supports being brought into substantial engagement adjacent the ends of said screws and driving one another when disengaged from said screws.

14. In conveying apparatus, a series of disconnected supports, guides for said supports, a plurality of drive screws of variable pitch mounted at an angle to each other and successively engaging said supports, said screws bringing said supports into substantial engagement adjacent the ends of said screws and said supports driving one another when disengaged from said screws.

15. In conveying apparatus, a series of disconnected supports, guiding and driving means for said supports forming a plurality of conveyer runs, reversers operated in unison with said driving means to engage the lateral portions of said supports and transfer said supports between said runs.

16. In conveying apparatus, a driving screw to engage and operate a support, a protruding interrupted thrust collar on said screw and a plurality of rolls engaging said thrust collar.

17. In conveying apparatus, a driving screw to operate a support, a protruding thrust collar on said screw, said thrust collar being interrupted by the helical slot of said screw and guiding means in engagement with said collar.

18. In conveying apparatus, a driving screw to operate a support, a protruding driving gear having considerable length on said screw, said gear being interrupted by the helical slot of said screw.

19. In conveying apparatus, a driving screw to operate a support, driving means having considerable axial length mounted on said screw, said driving means being interrupted by the helical slot of said screw.

20. In conveying apparatus, a series of supports, guiding and driving means engaging the lateral portions of said supports to independently drive each of said supports at variable speed and forming a conveyer run having an inclined portion, a horizontal working face on each of said supports intermediate its ends, stationary side pieces coöperating with said supports on either side of said working faces and a stationary inclined facing beneath said supports and in close contact therewith.

21. In conveying apparatus, a series of independent supports, guiding and driving means to engage and independently drive each of said supports at variable speed and a stationary facing adjacent said supports and in close contact therewith.

22. In conveying apparatus, a series of supports, guiding and driving means to engage and drive said supports in separated position, and a stationary continuous facing adjacent said supports and in close contact therewith.

BENJAMIN R. ADKINS.
WILLIAM Y. LEWIS.

Witnesses:
HARRY L. DUNCAN,
JESSIE B. KAY.